United States Patent [19]

Sterl

[11] Patent Number: 4,549,832
[45] Date of Patent: Oct. 29, 1985

[54] SLIP-IN FASTENING ELEMENT FOR JOINING TOGETHER TWO PARTS SO THAT THEY MAY BE UNDONE

[75] Inventor: Rudolf Sterl, Wendelstein, Fed. Rep. of Germany

[73] Assignee: Hestex Systems b.v., Apeldoorn, Netherlands

[21] Appl. No.: 442,776

[22] Filed: Nov. 18, 1982

[30] Foreign Application Priority Data

Nov. 26, 1981 [DE] Fed. Rep. of Germany ... 8134536[U]

[51] Int. Cl.$^4$ .............................................. F16B 7/04
[52] U.S. Cl. ................................... 403/264; 403/297; 16/277; 24/694
[58] Field of Search ................ 24/573, 574, 456, 486, 24/513, 514, 517, 568, 569, 608, 609, 639, 641, 653, 657, 684, 694; 403/201, 187, 252, 254, 255, 264, 297; 16/277

[56] References Cited

U.S. PATENT DOCUMENTS

| | | | |
|---|---|---|---|
| 3,552,783 | 1/1971 | Tauano | 403/297 X |
| 3,574,367 | 4/1971 | Jankowski | 403/297 X |
| 3,966,342 | 6/1976 | Moriya | 403/297 X |
| 4,017,199 | 4/1977 | Strassle | 403/264 |
| 4,360,286 | 11/1982 | Beer | 403/201 |

FOREIGN PATENT DOCUMENTS

| | | |
|---|---|---|
| 514900 | 7/1979 | Australia . |
| 569082 | 1/1933 | Fed. Rep. of Germany . |
| 1054320 | 9/1959 | Fed. Rep. of Germany . |
| 2059829 | 12/1969 | Fed. Rep. of Germany ...... 403/297 |
| 7036749.6[U] | 5/1970 | Fed. Rep. of Germany . |
| 1302838 | 11/1970 | Fed. Rep. of Germany . |
| 7517522.3[U] | 3/1975 | Fed. Rep. of Germany . |
| 7501856 | 7/1976 | Fed. Rep. of Germany . |
| 2906281 | 8/1980 | Fed. Rep. of Germany . |
| 2000838 | 9/1969 | France . |
| 2129259 | 10/1972 | France . |
| 96269 | 5/1959 | Norway . |
| 371707 | 10/1963 | Switzerland ..................... 16/277 |
| 591022 | 8/1977 | Switzerland . |
| 1243684 | 8/1971 | United Kingdom ............. 403/264 |
| 1477884 | 6/1977 | United Kingdom . |

Primary Examiner—William E. Lyddane
Assistant Examiner—Peter A. Aschenbrenner
Attorney, Agent, or Firm—Wenderoth, Lind & Ponack

[57] ABSTRACT

An expanding fastening element joins two structural members such as two pieces of girder of which one has a slot with lips at the sides thereof, so that the two members may be separated again when desired. The expanding fastening element includes two legs that are hinged together and may be opened out by way of a fixing screw into a locking or gripping position with hook-like heads of the legs hooked onto the lips. Before tightening the screw the fastening element is positioned at the desired position in a hole in one girder by a guide sleeve or plug locking into the second member and springingly pushed outwards from the fastening element by a spring within it.

The two legs or gripping members have keeper heads and slots at their ends opposite to the hooked heads to take up a c-like ring spring.

The threaded plug is pushed by at least one spring against the second of the two legs, in which the plug is taken up in a guide opening so that it may be pushed by the spring into an opening branching off from the hole (in the second member) into which the fastening element has been placed, the screw being in the plug.

In a hollow in the face of the second leg there is a support part for the inner end of the fixing screw.

5 Claims, 4 Drawing Figures

SLIP-IN FASTENING ELEMENT FOR JOINING TOGETHER TWO PARTS SO THAT THEY MAY BE UNDONE

BACKGROUND OF THE INVENTION AND PRIOR ART

The present invention relates to a fastening element for joining two structural members such as two pieces of girder of which one has a slot with lips at the sides thereof, the fastening element being so designed that the two members may be separated again when desired. More specially the invention relates to such an expanding fastening element made up of two legs that are hinged together and may be opened out by way of a fixing screw into a locking or gripping position with hook-like heads of the legs hooked onto the lips. Before tightening the screw the fastening element is positioned as desired in a hole in one girder by a side guide sleeve or plug locking into the second member and springingly pushed outwards from the fastening element by a spring within it.

In the past a number of different forms of expanding fastening elements have been designed for making connections between structural members, as for example between horizontal girders or wall elements and upright girders so that the connections made may be undone later when desired. One example is to be seen in Norwegian Pat. No. 96,260 using a cotter-like connection part, whose front end is slotted, having a fixing screw placed on one side of the slot for opening up the slotted part of the fastening element and moving hook-like end parts against the sides of holes in upright structural elements. As a further example, German Auslegeschrift specification No. 1,054,320 makes use of a support bracket, that is placed in a support rail and has hooked heads which are opened out and forced away from each other by a fixing screw so that they become locked onto lips at the sides of an opening in the support rail. German Auslegeschrift specification No. 1,302,838 relates to a system of frame-making elements, which are joined together by using two flat connection arms on one such frame part, which are plugged into a frame girder so that hooked ends of the arms may be forced outwards by spring force and then locked in position by an eccentric.

To take a further example of the prior art, German Gebrauchsmuster patent (utility model) No. 7,501,856 relates to an expanding plug made up of two hinged-together legs with hooked, outwardly bent ends, that may be fixed in position with a gripping effect and then locked by an eccentric. This expansion fastening element has a spring-like u-part for pulling back the legs out of the gripping position, at the back end of the fastening element. The two legs are joined together by a hinge at a back end.

German Offenlegungschrift specification No. 2,906,281 relates to a coupling element for rails or girders with lengthways slots using freely turning legs or gripping jaws which are forced outwards by a compression spring and are opened up by way of a fixing screw acting on the other of the two legs by way of a further spring. One form of the coupling element has a guide sleeve as well that is acted upon by a spring pushing it outwards so that it will be snapped into an opening in the wall of a hole into which the coupling element is slipped. The purpose said to be effected by this prior art design of coupling is that even before the fixing system is operated a friction connection may be produced between the hook heads of the coupling element and the edges of the slot or groove in the girder element so that the coupling element is simpler to put in place and is more simply handled.

SUMMARY OF THE PRESENT INVENTION

One purpose of the present invention is that of designing a readily-used, slip-in expanding fastening element of the sort noted which is not only simple to put in place in the girder or support element but furthermore after screwing up the expanding fastening element tight makes certain of a play-free connection or join between itself and the support material in which it has been placed.

For effecting this purpose, and further purposes, a slip-in expanding fastening element of the sort noted is characterized in that:
(a) the two legs or gripping members have keeper heads and slots at their ends opposite to the hooked heads to take up a c-like ring spring,
(b) there is a threaded plug which is kept pushed by at least one spring against the second of the two legs, in which the plug is taken up in a guide opening so that it may be pushed by the spring into an opening branching off from the hole (in the second member) into which the fastening element has been placed,
(c) and in a hollow in the face of the second leg there is a support part for the inner end of the fixing screw.

In a preferred working example of the invention, the two legs become narrower like wedges towards the end of the fastening element with the hooked heads.

As part of a further preferred development of the invention with legs becoming narrower like wedges along the length thereof, the second leg has a second, angled support part (in addition to the first support part) against which the slotted head of the first leg is rested.

It is furthermore possible for the second support part, taking up the force of the screw on expanding and screwing up the fastening element tight, to have two holes in which two compression springs are seated for acting on the plug.

This support part may be dish-like in form and the hollow in which it is placed is of the very same form for supporting it with a good fit. Furthermore the necks of the hooked heads of the legs may have stop shoulders It is moreover possible for the support part, and/or the threaded plug and/or the fixing screw of the expanding fastening element to be made of hardened steel, which may furthermore be galvanized and thereafter chromated.

The preferred material for the two legs or gripping jaws of such an expanding fastening element is die-cast zinc alloy.

Further details and useful effects of the expanding fastening element of the present invention will become clear on reading the account now to be given using the figures.

DESCRIPTION OF PREFERRED EMBODIMENTS

Figure 1:
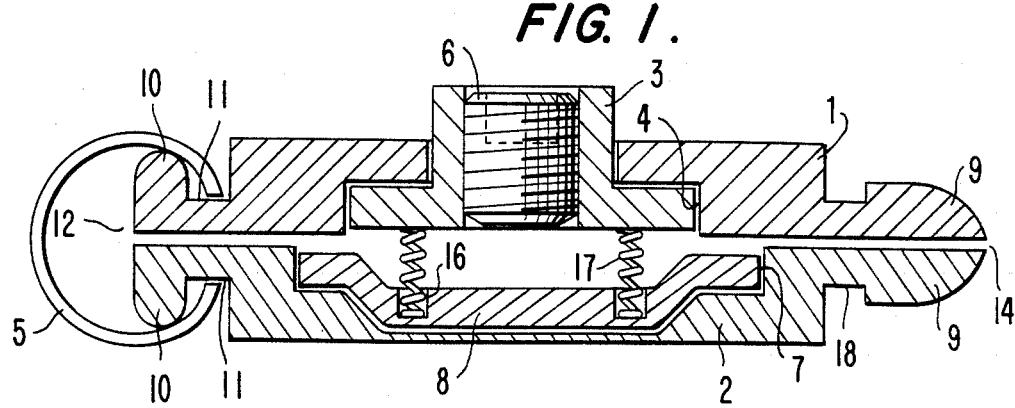
FIG. 1 is a lengthways section looking downwards onto a simple form of expanding fastening element of the present invention.

It will be noted that the expanding fastening element to be seen in FIG. 1 looking downwards and in lengthways section is made up of the two gripping jaws or legs 1 and 2, that are kept together by a c-like steel spring 5 with its two ends taken up in slots 11 at the left hand end 12 of the legs. Furthermore at this end the legs 1 and 2 have keeper heads 10 for stopping the spring from slipping off to the left. Because the left hand ends of the legs are joined together by a spring it is possible for these ends to be separated and opened out when the two legs are pushed outwards against the inner face of a hole in a girder or rail 20 (see FIG. 4). In other words, the legs 1 and 2 are pushed outwards along their full lengths and it is not only a question of the legs being hinged as in the prior art, but in fact the left hand ends may be opened out, to a small degree only, it is true, and fully seated against the wall of the hole into which the fastening element has been placed. Moreover before the expanding fastening element has been put in position in a hole the two legs thereof are kept together by the spring ring 5 without any chance of parts between the legs falling out of position, for example when being stored or transported, put in position or taken out of the girder.

Furthermore the expanding fastening element has a plug 3 with a female thread, the plug being slidingly supported in a cutout 4 in the leg 1. In the female thread in the plug 3 there is a fixing screw 6, more specially an allen screw. It will be seen that the plug is made up of a sleeve-like part, with a thick enough wall for the desired function, and a plate-like end part. For expanding the fastening element and screwing it up tight the allen screw is screwed inwards so that its inner end is forced against a support part 8. Because the plug 3 has its plate-like part or collar, the leg 1 is moved thereby.

It will be seen that the legs 1 and 2 each have a hooked or gripping head at the right hand end of the fastening element, that is to say, these heads have necks 18 or grooves for taking up lips at the edges of openings, such as slots in a girder or rail (see FIG. 4) so that the heads are locked within the rail.

On use of the expanding fastening element of the present invention it is first slipped lengthways into a hole in a first piece of girder or the like and because of the presence of two compression springs 17, which are seated in holes 16 in the support part 8, the threaded plug 3 may be pushed inwards by the inner face of the hole till the fastening element has been moved as far as an opening branching out therefrom, whereupon the plug will be snapped outwards by the springs 17 for locking the fastening element in the desired position. In this respect, once one end of the plug has been put in the hole, the outer end of the plug will have to be pushed inwards by hand so that the thickness of the fastening element as measured from the outer side of the leg 2 as far as the outer end of the plug in the pushed-in condition is not to be designed to be greater than the diameter of the hole in the girder. As noted, when the fastening element has been pushed fully home, the plug 3 will be forced outwards into the opening 13 (see FIG. 4) in the girder 20. This opening 13 will be at such a distance from the front end 14 of the legs 1 and 2 that only the neck 18 and the hooked or gripping heads 9 will still be without the hole. The necks or grooves 18 may then be locked onto the lips of the slot in the rail 21.

When nextly the fixing screw 6 is done up tight in the threaded plug 3 so that its inner end is forced against the support part 8, the two legs will be moved further away from each other, this being so not only at the end 14 but furthermore at the opposite end 12 so that the legs are forced tightly against the inner face of the hole in the girder 20 and at the right hand ends of the legs 1 and 2 their hooked heads 9 are locked onto the lips at the sides of the slot or other opening in the upright girder 21 for producing a strong positive join or connection.

Figure 2:
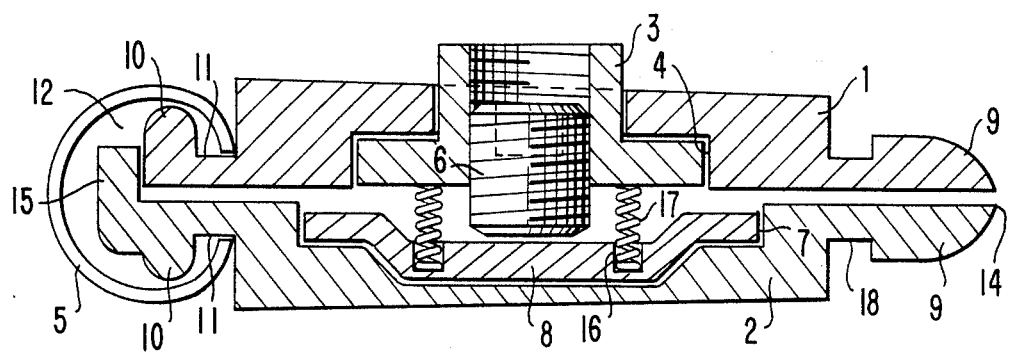
FIG. 2 is a lengthways section looking down on an expanding fastening element with wedge-like, narrowing legs, compression springs being seated in a dished support part, and with an angled support.

In FIG. 2 an expanding fastening element will be seen having a number of preferred design details of the present invention.

In this view, that is again a lengthways section looking downwards onto the fastening element, it will be noted that the legs 1 and 2 become narrower like wedges towards the end 14 having the hooked heads 9, this making it possible for these heads 9 to be made thicker, seeing that (because the end 14 is made narrower) the fastening element may be further opened out at the end 14 than at the opposite end 12, where however the degree of opening is great enough for the legs to be pressed against the inner face of the hole in the girder 20. If in this form of the invention there is an angled support 15 at the end 12 of the leg 2, because of the greater opening out of the legs at end 14 on doing up the fastening element, that is to say because of the overall greater angle of oppening, this angled support will be responsible for relative motion of the two legs in the direction of their length, the leg 2 being pulled backwards and the head 9 has a strong pulling effect on the girder 21 with the outcome that there is an even stronger fastening effect with less play, using the fastening element in one girder, for the connection of two pieces of girder.

As will be seen from FIGS. 1 and 2 the compression springs 17 are best placed in holes 16 in the support part 8, this making assembly of the fastening element simpler. However, in place of the two compression springs to be seen in FIGS. 1 and 2, it would naturally be possible to have a single helical spring of the right size for pushing the threaded plug 3 away from the support part 8. In this connection it is however to be noted that the compression springs are only to make assembly of the fastening element in the hole in a girder 20 simpler so that the threaded plug 3 is snapped home in the branch opening 13 in the girder 20. The spring or springs are not however responsible for producing any force such as might be important for opening out and locking the fastening element in position.

As may be seen in FIGS. 1 and 2, the support part 8 is dished and is taken up in a hollow 7 of the same form in the leg 2. Because of this dished form of the support part 8, it is made stiffer mechanically, even although it would be posible to have a flat support part 8.

Figure 3:
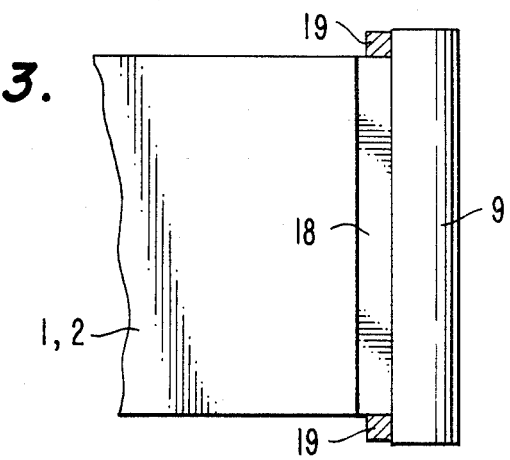
FIG. 3 is a side view of the front part of a leg with a hooked head having stops.

In the case of a further preferred working example of the invention to be seen in FIG. 3, at the ends of the grooves or necks 18 there are stops or shoulders 19 on the legs 1 and 2 so that they may not be pushed so far into the hole in the girder 20 that the grooves are covered up and fully within the girder. Moreover, if the opening 13 has been made at the wrong position and overly far from the right hand end of the girder 20 by a small amount, it will then not be possible for the threaded plug 3 to be snapped home into the opening 13 because of the presence of the shoulders 19.

One effect of great value produced by the present invention is that because of the design of the expanding fastening element, the two legs 1 and 2, which will be seen to be of generally complex form, may be made as zinc or light alloy die castings, this being more specially possible because the legs 1 and 2 do not have any screw threads therein (unlike the prior art) which would quickly become worn. In fact, the threads are only on the fixing screw 6 and the threaded plug 3, these parts best being made of steel, and more specially hardened steel, like the support part 8, so that bending or over-quick wear of such parts is out of the question. For decreasing the danger of corrosion, these parts may furthermore be galvanized and possibly chromated.

The support part 8 is needed in the event of the legs being made of die-cast zinc alloy to make certain that there is a low wear rate and that the force of the end of the screw takes effect over a large area. Moreover, there is then no chance of the legs being bent.

Figure 4:
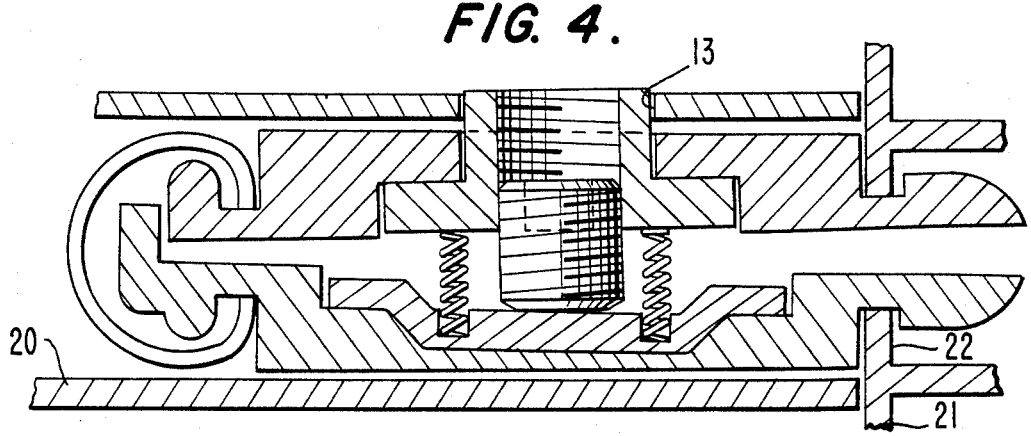
FIG. 4 is a diagrammatic lengthways section and view looking downwards onto the structure of FIG. 2 after putting an expanding fastening element lengthways into a horizontal rail or girder for joining it to an upright girder.

FIG. 4 is a diagrammatic view of an assembly with two girders or rails 20 and 21 joined together with the fastening element, girder 21 having the groove with lips or flanges 22 at the sides thereof, which are taken up in the necks 18 of the two heads 9.

The scope of the invention is not to be limited to the details thereof as given in the specification but is dependent on the spirit and gist of the claims, in which respect single details of the invention as given in the specification, the claims and the figures may be important insasfar as they are different from the prior art.

I claim:

1. In an expandable locking fastening element for joining together first and second structural members, said fastening element being of the type including first and second generally parallel legs having adjacent first and second ends, said two legs being joined together by hinge means so that they may be hinged about an axis which is at said first ends and which is generally normal to a direction of expansion of said fastening element for locking the same in position, a fixing screw for moving said legs apart and thus for causing such expansion, each said leg having at said second end thereof a hooked head adapted to be hooked onto a part of a lip at an edge of an opening in a first structural member to be joined, one of said legs having therein a sliding sleeve adapted to lock said fastening element in a desired position of adjustment along a hole in a second member to be joined and into which said fastening element is to be positioned, the improvement wherein:

said hinge means comprises a c-shaped spring ring having jaws fitting into grooves formed in said first ends of said legs;

said sliding sleeve comprises an internally threaded plug slidably extending through an opening in said first leg;

said second leg has a support member;

said fixing screw is threaded into said plug and has an inner end movable between a retracted position spaced from said support member, whereat said spring ring urges said legs toward each other, and an extended position abutting said support member, whereat said legs are forced apart against the action of said spring ring; and one of said legs has extending from said first end thereof a support member for supporting said first end of the other of said legs.

2. The fastening element as claimed in claim 1, wherein said two legs become narrower towards said second ends thereof.

3. The fastening element as claimed in claim 1, further having compression springs seated in openings in said support member for urging said plug outwardly.

4. The fastening element as claimed in claim 1, wherein said support member is in the form of a dish fitting within a hollow formed in said second leg.

5. The fastening element as claimed in claim 1, wherein said hooked heads have thereon stop shoulders.

* * * * *